United States Patent
Matsumoto

(10) Patent No.: US 7,821,681 B2
(45) Date of Patent: Oct. 26, 2010

(54) IMAGE FORMATION DEVICE AND SUPPORT BODY

(75) Inventor: Hideki Matsumoto, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 945 days.

(21) Appl. No.: 11/657,480

(22) Filed: Jan. 25, 2007

(65) Prior Publication Data

US 2008/0068680 A1   Mar. 20, 2008

(30) Foreign Application Priority Data

Sep. 14, 2006   (JP)   ............................. 2006-249291

(51) Int. Cl.
*H04N 1/00* (2006.01)
*H04N 1/46* (2006.01)

(52) U.S. Cl. .................... 358/474; 358/501; 358/505; 358/401

(58) Field of Classification Search ................. 358/500, 358/501, 400, 401, 505, 474; 399/75, 119, 399/115; 347/3, 111, 119
See application file for complete search history.

(56) References Cited

U.S. PATENT DOCUMENTS

| | | | |
|---|---|---|---|
| 6,832,831 B2 * | 12/2004 | Shima et al. ................. | 347/102 |
| 6,947,680 B2 * | 9/2005 | Oka et al. ...................... | 399/45 |
| 7,164,512 B2 * | 1/2007 | Takei .......................... | 358/496 |
| 7,354,037 B2 * | 4/2008 | Olson et al. ............... | 270/58.14 |
| 7,463,835 B2 * | 12/2008 | Harumoto .................... | 399/12 |
| 7,613,422 B2 * | 11/2009 | Shida et al. ................. | 399/407 |
| 2004/0251589 A1 * | 12/2004 | Satoh et al. ............... | 271/10.01 |
| 2005/0031371 A1 * | 2/2005 | Kaida et al. ................. | 399/110 |
| 2006/0182476 A1 | 8/2006 | Imada et al. | |

FOREIGN PATENT DOCUMENTS

| | | | |
|---|---|---|---|
| JP | 405155177 | * | 6/1993 |
| JP | 07-252015 A | | 10/1995 |
| JP | 2000-356246 A | | 12/2000 |
| JP | 2001-203840 A | | 7/2001 |
| JP | 2003-084517 A | | 3/2003 |
| JP | 2004-184982 A | | 7/2004 |
| JP | 2005-309279 A | | 11/2005 |
| KR | 10-2006-0091696 A | | 8/2006 |

* cited by examiner

*Primary Examiner*—Jerome Grant, II
(74) *Attorney, Agent, or Firm*—Sughrue Mion, PLLC

(57) ABSTRACT

An image formation device is provided with an image formation section which forms an image on a recording medium, a frame which accommodates the image formation section and is supported at a base surface, an image acquisition section which is disposed at an upper side relative to the image formation section, and a support body which supports the image acquisition section at the base surface and to which a side portion of the frame is attached.

27 Claims, 13 Drawing Sheets

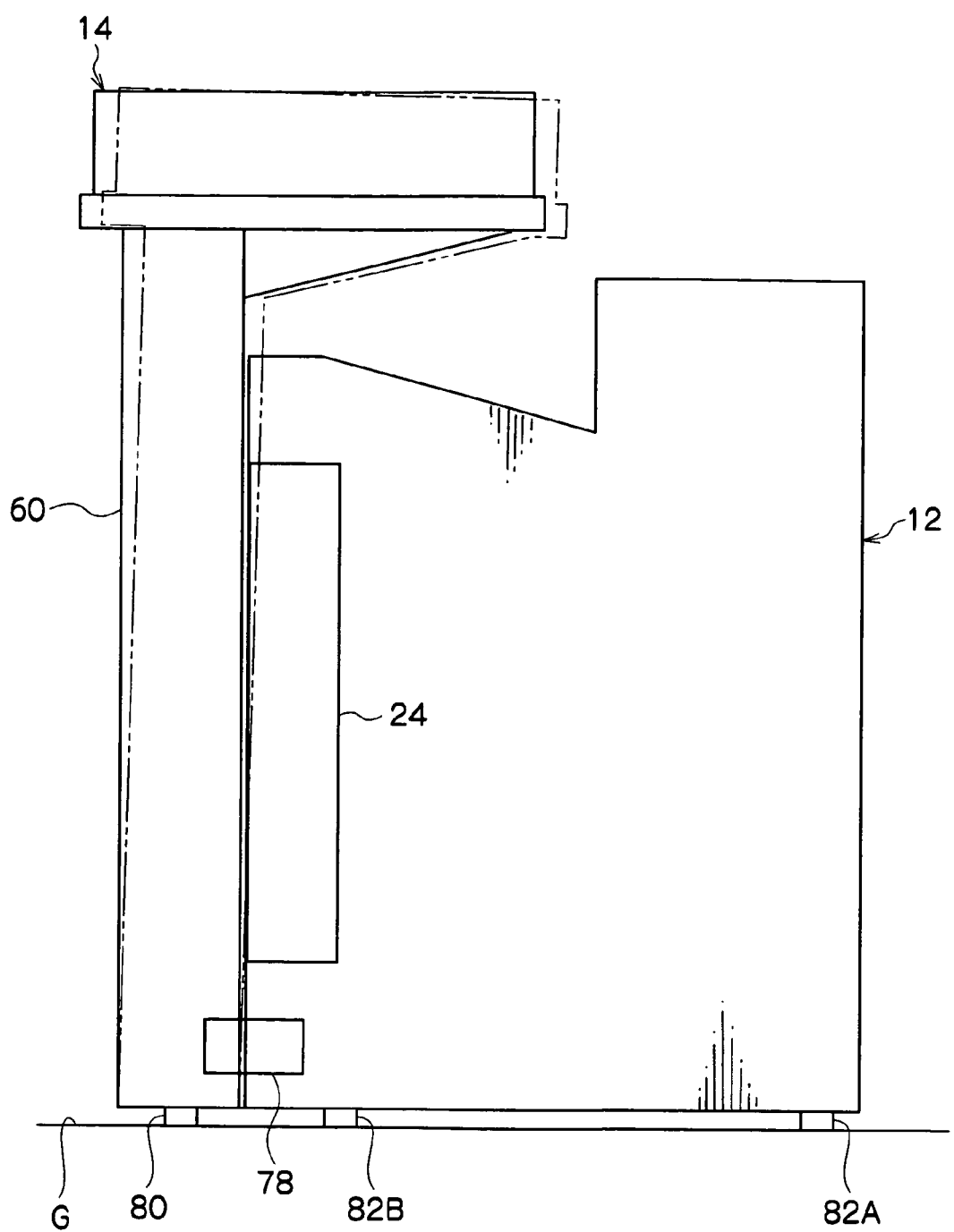

IMAGE FORMATION DEVICE AND SUPPORT BODY

BACKGROUND

1. Technical Field

The present invention relates to an image formation device which includes an image formation section and an image acquisition section, and to a support body.

2. Related Art

Heretofore, image formation devices have been proposed in which an image acquisition unit is disposed upward of an image formation unit.

SUMMARY

An image formation device of a first aspect of the present invention includes: an image formation section which forms an image on a recording medium; a frame which accommodates the image formation section and is supported at a base surface; an image acquisition section which is disposed at an upper side relative to the image formation section; and a support body which supports the image acquisition section at the base surface and to which a side portion of the frame is attached.

BRIEF DESCRIPTION OF THE DRAWINGS

An exemplary embodiment of the present invention will be described in detail based on the following figures, wherein:

FIG. 10 is a view showing a structure in which a reinforcement member of the present embodiment is disposed at a lower side;

DETAILED DESCRIPTION

Herebelow, a best embodiment of the present invention will be described in detail with reference to the drawings.

Figure 1:
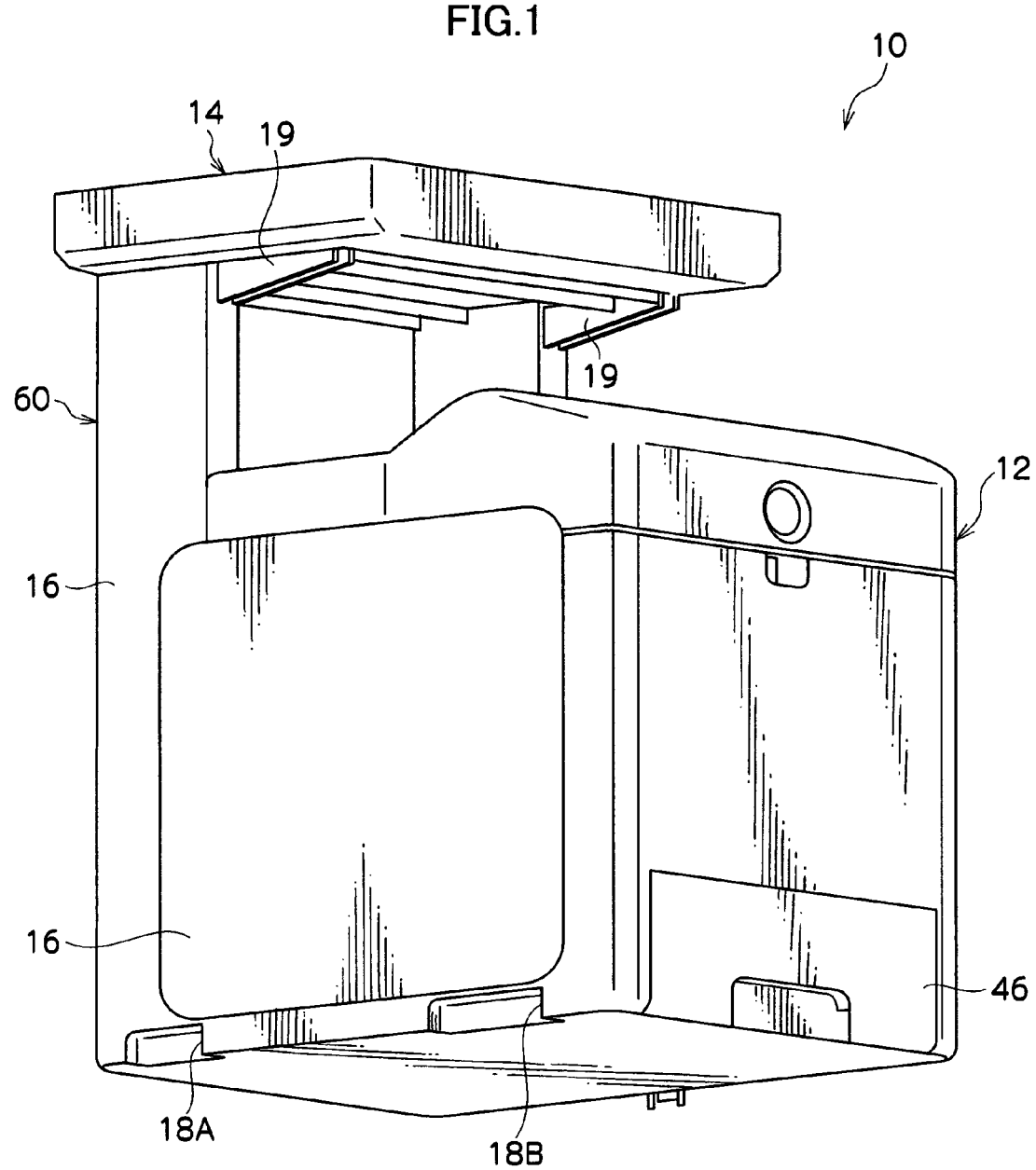
FIG. 1 is a perspective view showing the exterior of an image formation device of the present embodiment.

As shown in FIG. 1, an image formation device 10 relating to the present invention is provided with an image formation section 12, an image acquisition section 14 and a support body 60.

Figure 2:
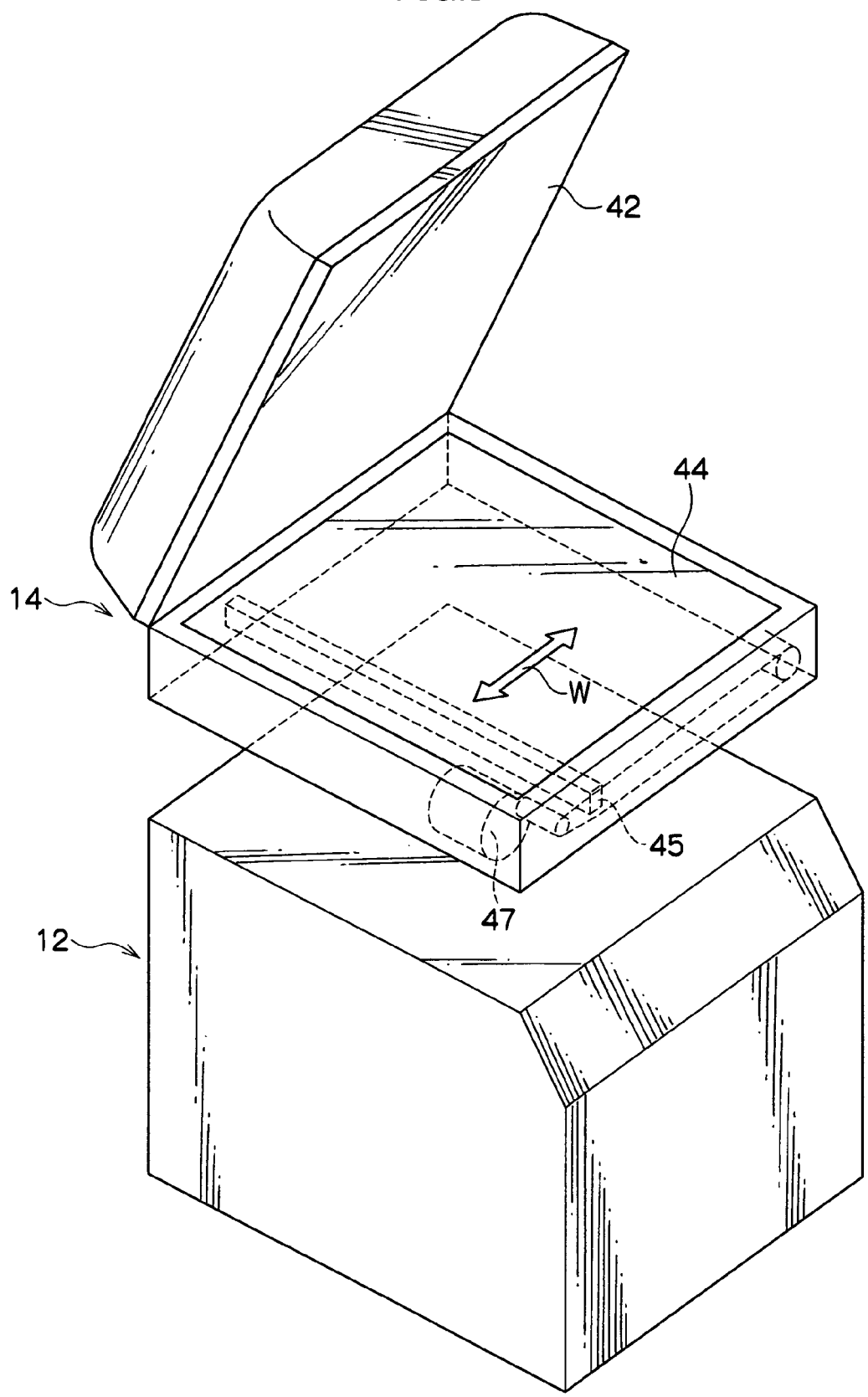
FIG. 2 is a perspective view showing exteriors of an image acquisition section and an image formation section of the image formation device of the present embodiment.

The image acquisition section 14 is disposed at an upper side of the image formation section 12 with a gap opened therebetween. As shown in FIG. 2, the image acquisition section 14 is provided with a retention board 42. The retention board 42 can be opened and closed. Below the retention board 42, a transparent original stage 44 constituted with a platen glass or the like is provided, at an upper face of which an original will be placed. Below the original stage 44, a reading bar 45 constituted with a CCD or the like is provided, which reads the original that has been placed on the original stage 44. The reading bar 45 is formed in a long, narrow shape from a front face side to a back side, is moved in the directions of arrow W by a scanning driving mechanism 47, and acquires an image of the original that has been placed on the original stage 44. Data acquired by the reading bar 45 is memorized as image data.

Figure 3:
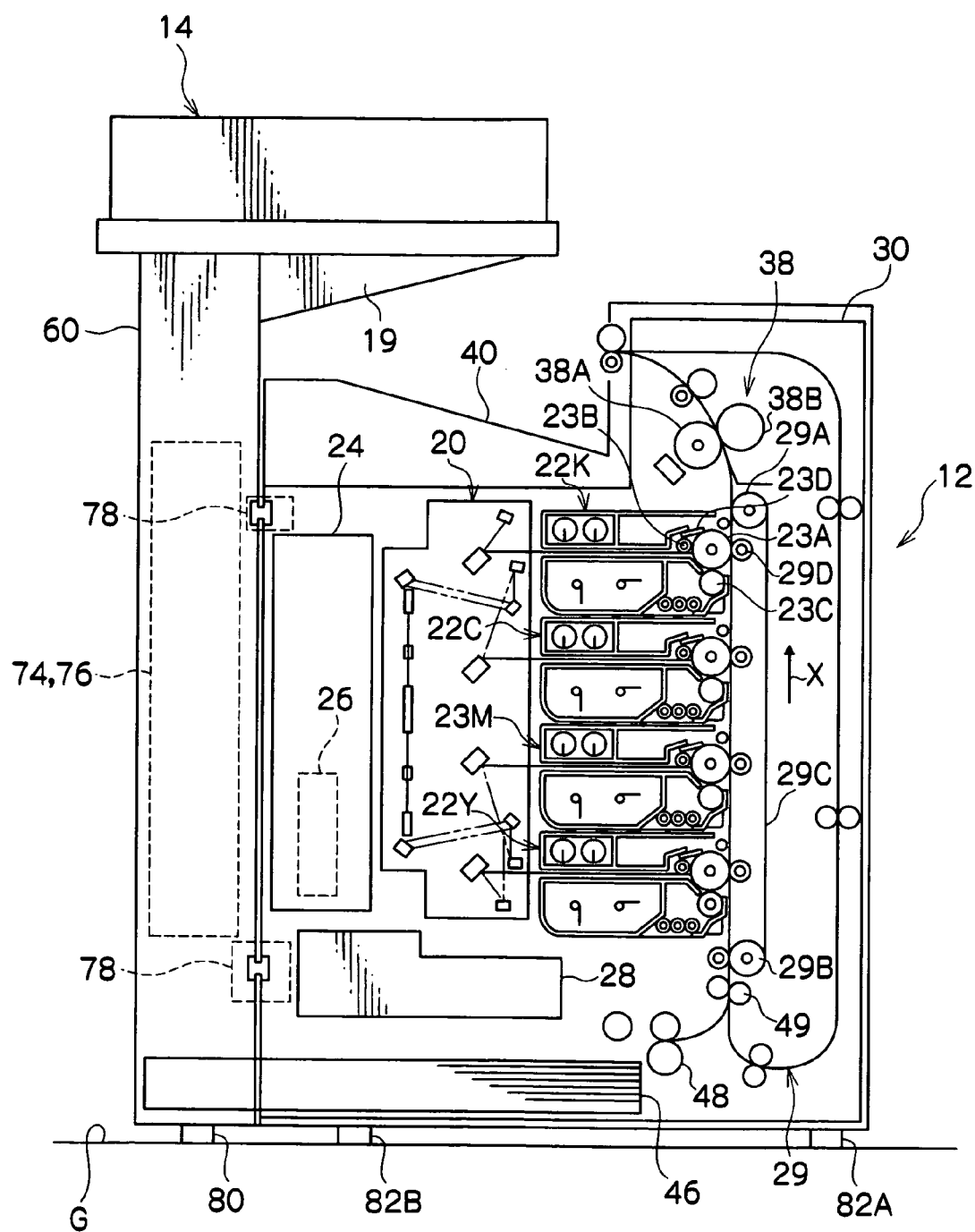
FIG. 3 is a schematic structural view showing structure of the image formation device of the present embodiment.

As shown in FIG. 3, the image formation section 12 is provided with an optics unit 20, developing units 22, a device operation control unit 24, a low-voltage power supply section 28, a conveyance unit 29 and a fixing section 38. The device operation control unit 24 is structured with a circuit board and the like including a CPU for controlling operations of the device: of the image formation section 12, the image acquisition section 14 and so forth. A high-voltage power supply section 26 is incorporated in the device operation control unit 24. The image formation section 12 can be employed alone to serve as a printer. The sections structuring the image formation section 12 are arranged in the following order from a near side (the right side of FIG. 3): the conveyance unit 29, the developing units 22, the optics unit 20 and the device operation control unit 24. The low-voltage power supply section 28 is disposed below the optics unit 20 and the device operation control unit 24, and the fixing section 38 is disposed at a portion upward of the developing units 22. These are all accommodated in a frame 30.

Each developing unit 22 is provided with a roller-form image-bearing body 23A, a charging roller 23B, a developing roller 23C and a cleaning member 23D. The charging roller 23B uniformly charges a surface of the image-bearing body 23A, and the developing roller 23C selectively transfers toner to a latent image formed on the image-bearing body 23A, to make the latent image visible. The cleaning member 23D rubs against the image-bearing body 23A after the toner image has been transferred and cleans off toner that remains on the image-bearing body 23A. The developing unit 22 is provided for each of the colors yellow (Y), magenta (M), cyan (C) and black (K), arranged in the following order from the upper side: developing unit 22K, developing unit 22C, developing unit 22M and developing unit 22Y.

The optics unit 20 illuminates imaging light onto each image-bearing body 23A in accordance with image data, and forms the latent image by differences in electrostatic potentials at the surface of the image-bearing body 23A.

The image-bearing body 23A features a photosensitive layer at the surface (i.e., a peripheral face) thereof. After the surface (the peripheral face) has been uniformly charged by the charging roller 23B, the surface (the peripheral face) is exposed with laser light (imaging light) illuminated from the optics unit 20, and an electrostatic latent image (an image) is formed by potentials of exposed portions being attenuated. Herein, the charging roller 23B abuts against the image-bearing body 23A, a voltage is applied thereto, and discharges occur in a small gap in the vicinity of the abutting portion. Thus, the surface (the peripheral face) of the image-bearing body 23A is substantially uniformly charged.

The developing roller 23C is disposed so as to be close to and opposing the image-bearing body 23A, and a developing bias voltage is applied between the developing roller 23C and the image-bearing body 23A. As a result, a developing bias electric field is formed between the developing roller 23C and the image-bearing body 23A, toner carrying electric charge is transferred to portions on the image-bearing body 23A that have been exposed, and a visible image is formed.

The conveyance unit 29 is provided with a conveyance belt 29C, which spans between a driving roller 29A and a driven roller 29B. At an inner face side of the conveyance belt 29C, at predetermined positions between the driving roller 29A and the driven roller 29B, transfer rollers 29D are plurally arranged (four thereof, corresponding to the respective colors) with a predetermined spacing therebetween. Recording paper P is conveyed in the direction of arrow X by the conveyance belt 29C.

Each transfer roller 29D opposes the image-bearing body 23A with the conveyance belt 29C sandwiched therebetween, and forms a transfer electric field between the transfer roller 29D and the image-bearing body 23A. As a result, the toner image on the surface of the image-bearing body 23A (an unfixed image) is transferred onto the recording paper P, which is attracted and conveyed by the conveyance belt 29C and passes between the transfer roller 29D and the image-bearing body 23A.

The fixing section 38 is disposed at a downstream side in the direction of conveyance of the recording paper P relative to the developing units 22. The fixing section 38 is provided with a heating roller 38A and a pressure roller 38B, peripheral faces of which oppose one another, and which press (nip) with a predetermined pressure. An unfixed toner image which has been transferred onto the recording paper P is heated and pressed by the heating roller 38A and the pressure roller 38B, and thus the toner image is fixed to the recording paper P.

The recording paper P to which the toner image has been fixed by the fixing section 38 is ejected onto an ejection tray 40. Further, after transfer of a toner image to the recording paper P has finished, the surface (the peripheral face) of the image-bearing body 23A is subjected to cleaning processing by the cleaning member 23D, and is provided to a subsequent image creation process.

At a lower portion of the frame 30, a mountable and removable paper supply cassette 46 is provided. The paper supply cassette 46 can be drawn out in a nearward direction, and can supply suitable recording paper P. A paper supply roller pair 48 is disposed in a vicinity of a distal end portion of the paper supply cassette 46. The paper supply roller pair 48 feeds out the recording paper P from inside the paper supply cassette 46 one sheet at a time. The recording paper P which has been fed out through the paper supply roller pair 48 is fed to an attraction and conveyance surface of the conveyance belt 29C with a predetermined timing, by a registration roller 49, and is conveyed to transfer positions of the toner images of the respective colors.

Figure 4:
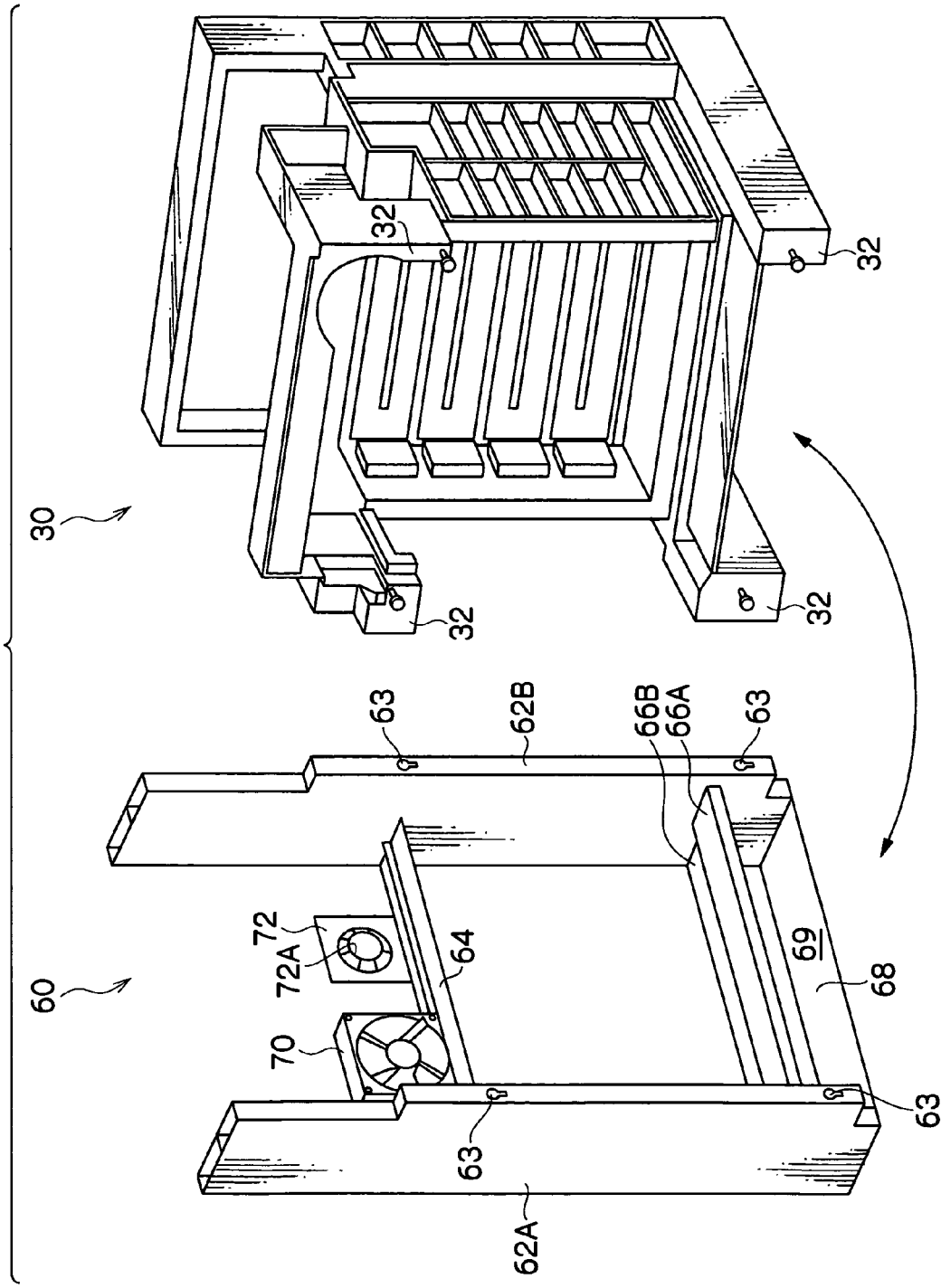
FIG. 4 is a schematic perspective view of a support body and a frame of the present embodiment.

As shown in FIG. 4, the frame 30 is provided with attachment portions 32 at four corners of a rear face side thereof. The attachment portions 32 protrude in a furtherward direction, and distal end faces thereof are attached to the below-described support body 60.

The support body 60 is provided with a pair of support pillars 62A and 62B, an upper connection plate 64, a lower connection plate 66 and a floor plate 68. The support pillars 62A and 62B are provided standing in a vertical direction at the rear face side of the frame 30, with a gap corresponding to a width of the frame 30 opened therebetween. The image acquisition section 14 is mounted at the top of the support pillars 62A and 62B. The image acquisition section 14 is supported from a floor surface G by the support pillars 62A and 62B. The support pillar 62A and the support pillar 62B are linked by the upper connection plate 64, the lower connection plate 66 and the floor plate 68, which are arranged in a horizontal direction.

Figure 5:
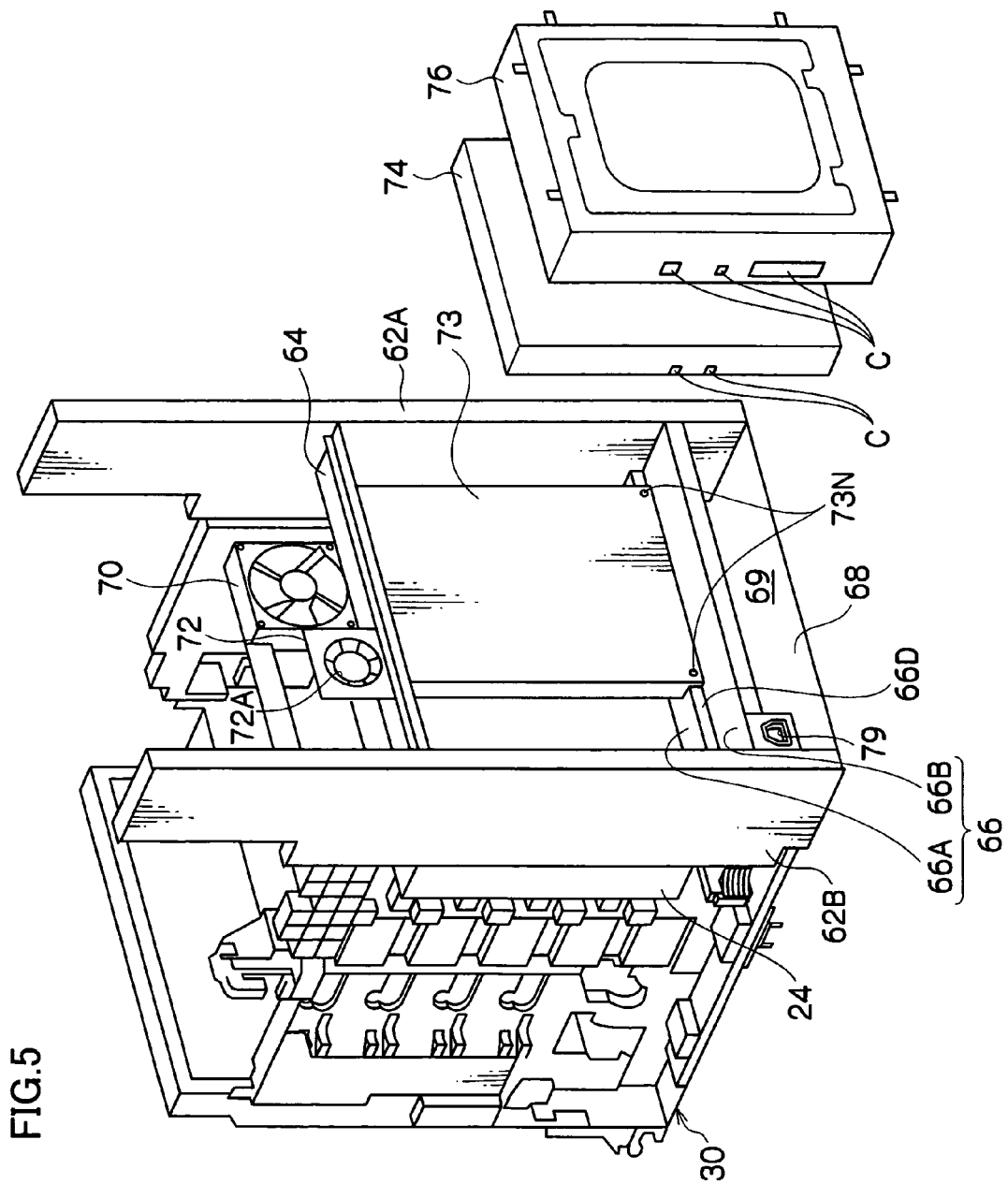
FIG. 5 is a perspective view showing a state in which the support body and frame of the present embodiment are joined.
Figure 6:
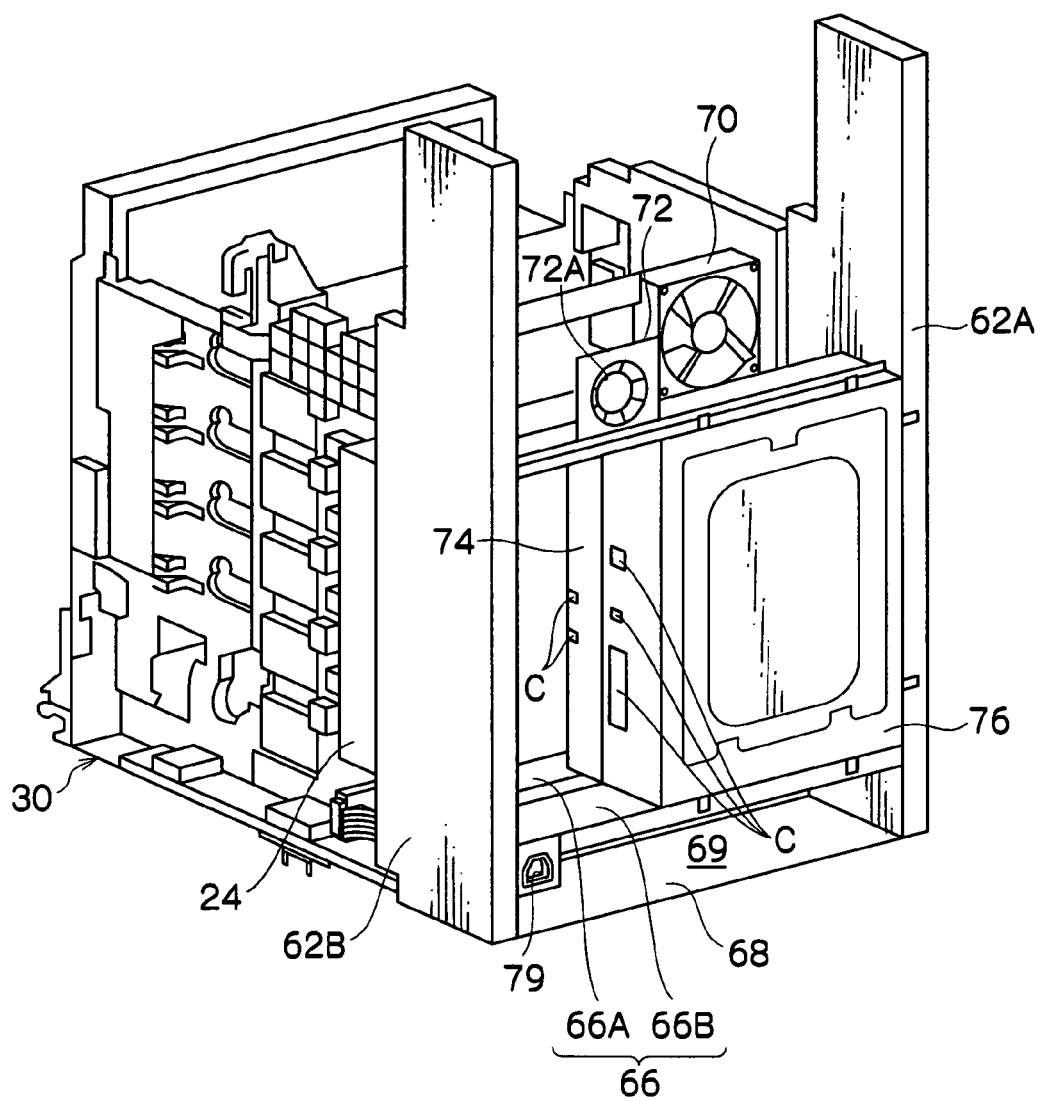
FIG. 6 is a perspective view showing a state in which various control units are disposed at the support body of the present embodiment.

As shown in FIGS. 5 and 6, the upper connection plate 64 is disposed upward relative to a vertical direction central portion of the support pillars 62A and 62B. A fan 70 and a sound output section structural plate 72 are mounted at the upper connection plate 64. The sound output section structural plate 72 is structured with a hole for sound output 72A.

The lower connection plate 66 is disposed downward relative to the vertical direction central portion of the support pillars 62A and 62B. The lower connection plate 66 features a step in the front-rear direction, and a first level 66A and a second level 66B are structured by this step. A step wall 66D is structured between the first level 66A and the second level 66B. The first level 66A is disposed at a side of mounting of the image formation section 12, and is formed as a step which is higher than the second level 66B. As shown in FIG. 6, a multifunction controller unit 74 is disposed at the first level 66A, and a printer controller unit 76 is disposed at the second level 66B. The multifunction controller unit 74 is a control unit for implementing copier functions, fax functions and scanner functions, and a driving frequency of a CPU thereof will generally be high. In contrast, the device operation control unit 24 and the printer controller unit 76, which implements printer functions, have comparatively low frequencies. Accordingly, the multifunction controller unit 74 with high frequencies and large amounts of noise is disposed to be sandwiched between the printer controller unit 76 and the device operation control unit 24. That is, the various controller units are arranged in the following order from an outermost side: the printer controller unit 76, the multifunction controller unit 74, and the device operation control unit 24. Consequently, the circuit boards and chassis (metal plates) of the printer controller unit 76 and the device operation control unit 24 function as electromagnetic shields. Thus, leakage of electromagnetic noise that is emitted from the multifunction controller unit 74 to the exterior and ingression of the electromagnetic noise into the interior of the device can be suppressed.

Each controller unit is structured with a circuit board or the like being disposed in a chassis which opens to the inward side, the lower side and the support pillar 62A side thereof, and each controller unit is provided with a connector C for connection with external components. The multifunction controller unit 74 is provided with a control circuit board 73 and, as shown in FIG. 5, is fixed to the step wall 66D by screwing with bolts 73N from the outer side. The outer side of the control circuit board 73 is enclosed by the above-mentioned chassis, the support pillar 62B and the lower connection plate 66. In this manner, a structure for mounting the control circuit board 73 to the step wall 66D is formed, and thus the circuit board can easily be arranged in a vertical form from the side of an opening in the rear face.

The support pillars 62A and 62B and the lower connection plate 66 are set to a ground potential, and the control circuit board 73 is connected with the lower connection plate 66 by the bolts 73N and set to the ground potential. Thus, because the control circuit board 73 and ground are directly connected by the screw-fixing to the lower connection plate 66, potential of the control circuit board 73 can be reliably dropped to the ground potential.

An inlet 79, for insertion of an electrical outlet, is formed at a lower side corner portion which is structured by the second level 66B and the support pillar 62A.

The floor plate 68 is disposed at floor portions of the support pillars 62A and 62B. An aperture 69 is formed between the floor plate 68 and the lower connection plate 66. A rear end portion of the paper supply cassette 46 can be inserted at the aperture 69.

As shown in FIG. 4, holding portions 63 are formed in the support pillars 62A and 62B at locations corresponding to the attachment portions 32 of the frame 30. The attachment portions 32 and the holding portions 63 constitute a shock-absorbing structure for absorbing vibrations from the image acquisition section 14.

Figure 7:
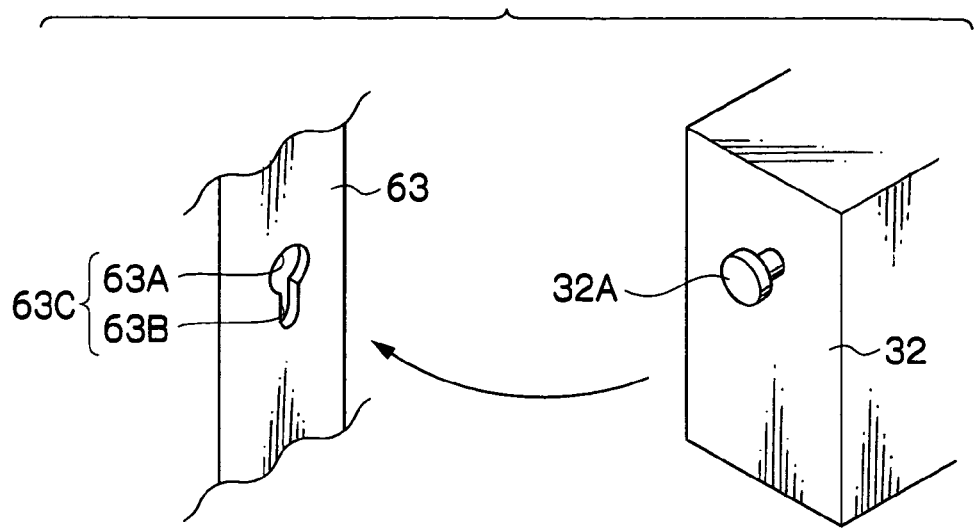
FIG. 7 is a view showing an example of structure of an attachment portion and a holding portion of the present embodiment.
Figure 8:
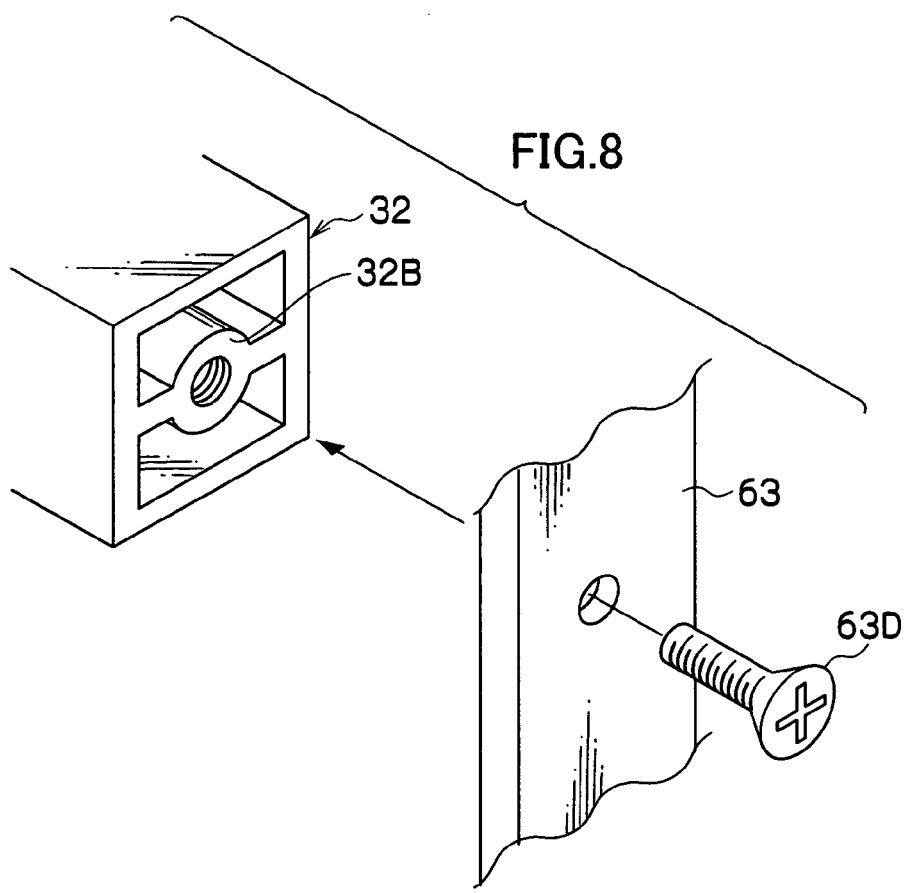
FIG. 8 is a view showing another example of structure of the attachment portion and holding portion of the present embodiment.

As the shock-absorbing structure, for example, a structure is possible in which, as shown in FIG. 7, the attachment portion 32 is formed as an engaging protrusion portion 32A of which a distal end is formed in a disc shape, and the holding portion 63 is an engaging hole 63C of which an upper side is structured by a large diameter hole 63A, at which the engaging protrusion portion 32A can be inserted, and a lower side of which is structured by a long, narrow groove 63B in the vertical direction. In such a case, the engaging protrusion portions 32A are inserted into the large diameter holes 63A and slid downward along the grooves 63B, and disposed at lower end portions thereof. Hence, the support pillars 62A and 62B and the frame 30 are relatively movable in an up-down direction (the vertical direction). Alternatively, as shown in FIG. 8, the attachment portion 32 structures hollows surrounding a threaded hole, and is formed with a threaded hole member 32B which structures the threaded hole. Then, the holding portion 63 is attached by screw-fixing with a bolt 63D from the holding portion 63 side. In such a case, vibrations from the image acquisition section 14 can be absorbed by the threaded hole members 32B having low stiffness and vibrating.

Alternatively, rather than a structure of spaces or the like, a portion which is the attachment portion 32 is simply structured by a member with lower stiffness than other portions of the frame 30, for example, a rubber member or foam member, and thus is capable of absorbing vibrations from the image acquisition section 14.

Figure 9:
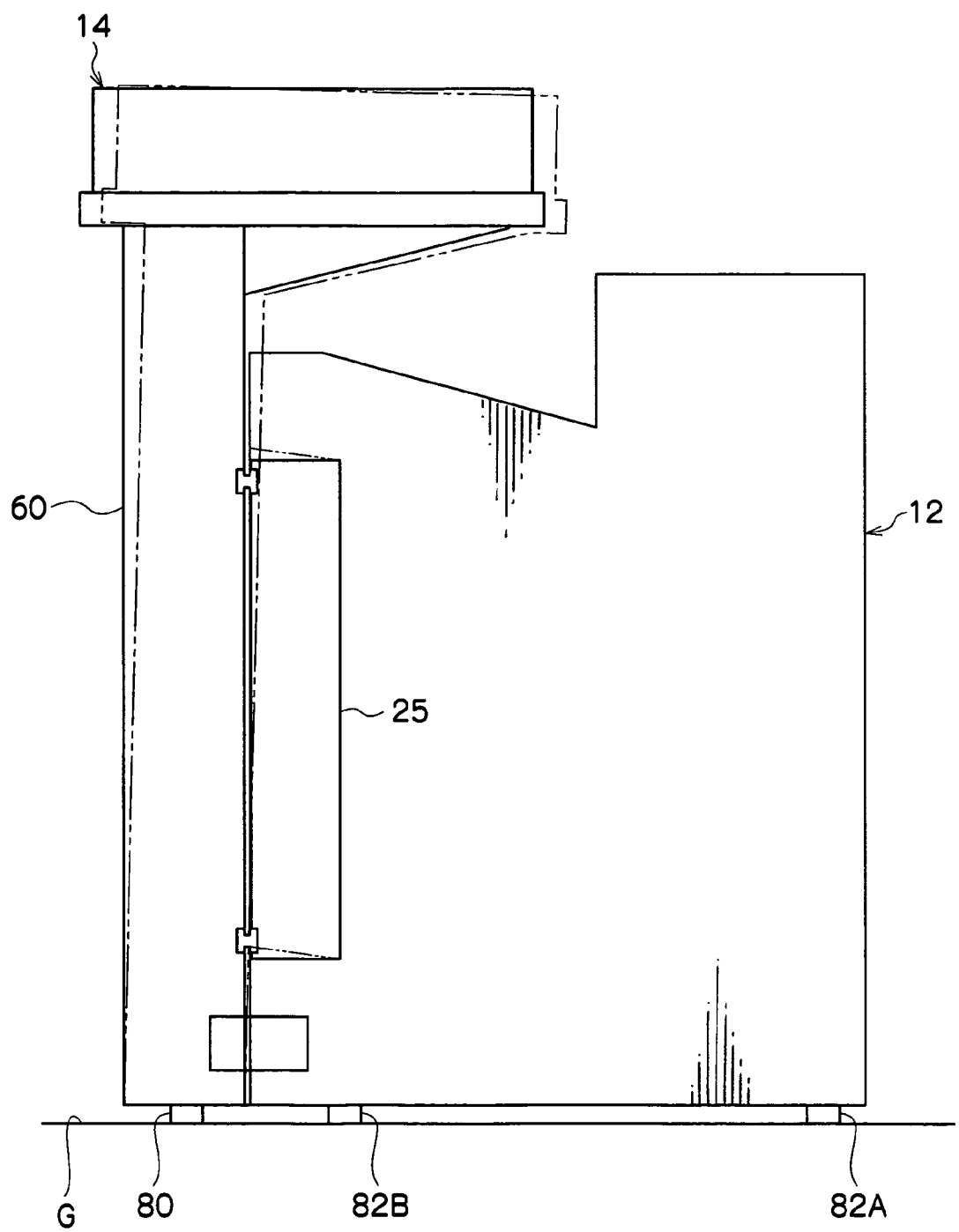
FIG. 9 is a view showing another example of attachment of the support body and the frame of the present embodiment.

Further, the support body 60 may be mounted to a frame body 25 which is accommodated in the frame 30. If the frame body 25 is a structure which is capable of deforming in accordance with tilting of the support body 60, as shown in FIG. 9, a shock-absorbing effect can be provided by the frame body 25. Herein, the chassis of the device operation control unit 24 may be employed as the frame body 25.

As shown in FIG. 3, reinforcement members 78 are provided at locations at which the mounting portions 32 are attached to the holding portions 63. The reinforcement members 78 are formed in plate forms, and are attached to both the frame 30 and the support body 60 so as to bridge therebetween. The joining of the frame 30 with the support body 60 is reinforced by the reinforcement members 78.

However, the reinforcement members 78 need not necessarily be provided at four locations, and could be provided at the two lower side locations as shown in FIG. 10. In particular, reinforcement of the lower side is desirable because stronger forces act at the lower side due to swinging of the support body 60 as shown by the broken lines in FIG. 10, which is caused by loads on the image acquisition section 14 and the like.

First support portions 80 are provided at the lower side of the support body 60, and second support portions 82 are provided at the lower side of the frame 30. One each of the first support portions 80 are provided below the support pillar 62A and the support pillar 62B. Two of the second support portions 82 are provided at the front side of the frame 30, and two at the rear side (the support body 60 side) of the frame 30 (herebelow, the two at the front side are referred to as distant support portions 82A and the two at the rear side are referred to as proximate support portions 82B).

Figure 11A:
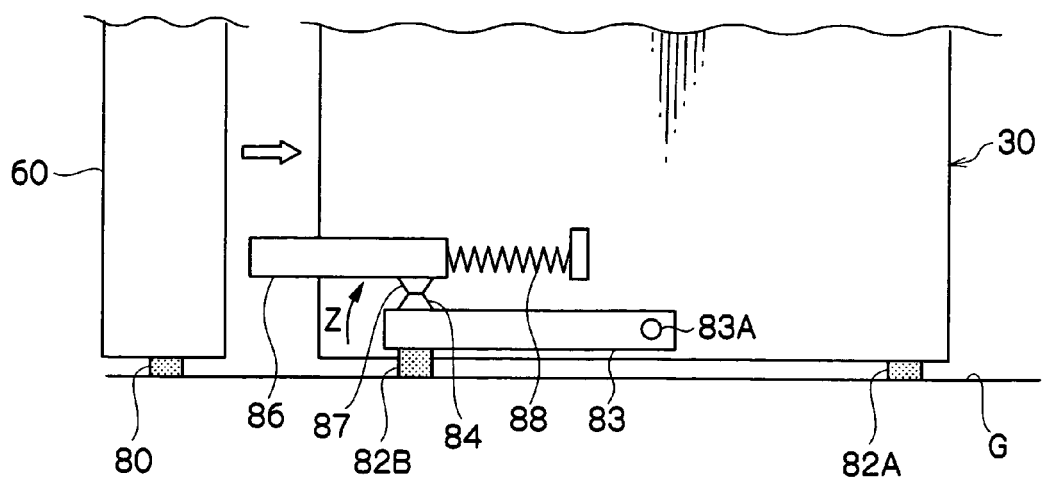
FIGS. 11A and 11B are schematic structural views showing structure of a proximate support portion of the present embodiment.
Figure 11B:
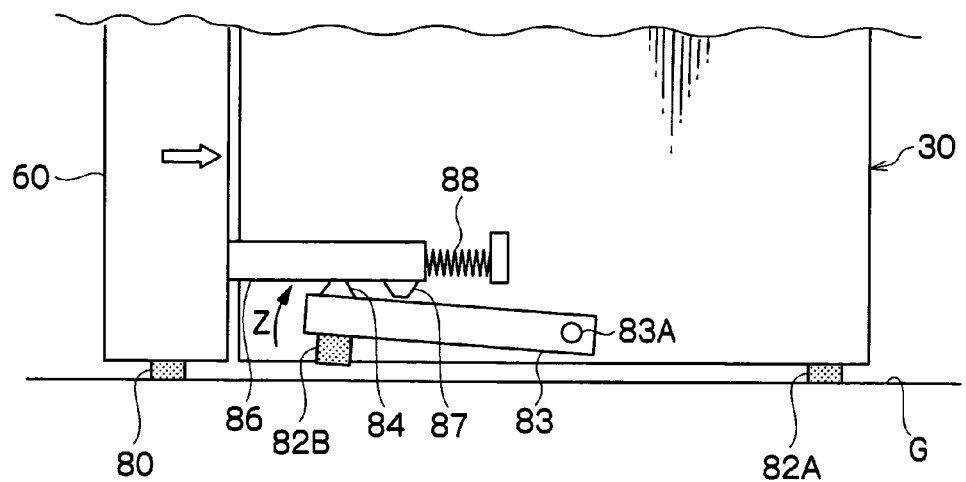

As shown in FIGS. 11A and 11B, each proximate support portion 82B is attached to the lower side of a lever 83. The lever 83 is attached to the frame 30 so as to be rotatable about an axis of rotation 83A. The lever 83 is urged in a Z direction (a direction in which the proximate support portion 82B rises up) by an unillustrated urging member. A rib 84 is provided at an upper side of the lever 83. The rib 84 has a taper form with diameter reducing toward the upper side. A long, narrow pressing member 86 is also attached to the frame 30. The pressing member 86 is provided with a rib 87 at a position corresponding with the rib 84. The rib 87 has a taper form with diameter reducing toward the lower side. One end of the pressing member 86 protrudes to the outer side of the frame 30, and the other end abuts against a spring 88 which is provided inside the frame 30 and is urged toward the outer side of the frame 30 by the spring 88.

In a state in which the support body 60 is not joined with the frame 30, the rib 87 rests on an upper portion of the rib 84 and, as shown in FIG. 11A, the proximate support portion 82B is caused to be disposed at a position contacting the floor surface G by the pressing member 86. When the support body 60 and the frame 30 are joined, as shown in FIG. 11B, the one end side of the pressing member 86 is pushed by the support body 60 and moves to the inner side, the rib 87 and the rib 84 disengage, the lever 83 retracts in the Z direction, and the proximate support portion 82B moves out of contact with the floor surface G.

When the image formation section 12 is used by itself, both the proximate support portions 82B and the distant support portions 82A are required for supporting the image formation section 12 on the floor surface G. However, when the image formation section 12 is used in combination with the image acquisition section 14, because the first support portions 80 are provided at the support body 60, this requirement does not necessarily apply. Accordingly, as described above, in conjunction with attachment of the support body 60 to the frame 30, the proximate support portions 82B are disposed to positions of non-contact with the floor surface G. Therefore, the proximate support portions 82B will not protrude from a plane constituted by the first support portions 80 and the distant support portions 82A and cause wobbling, and the image formation device 10 will be stably supported at the floor surface G.

Figure 12:
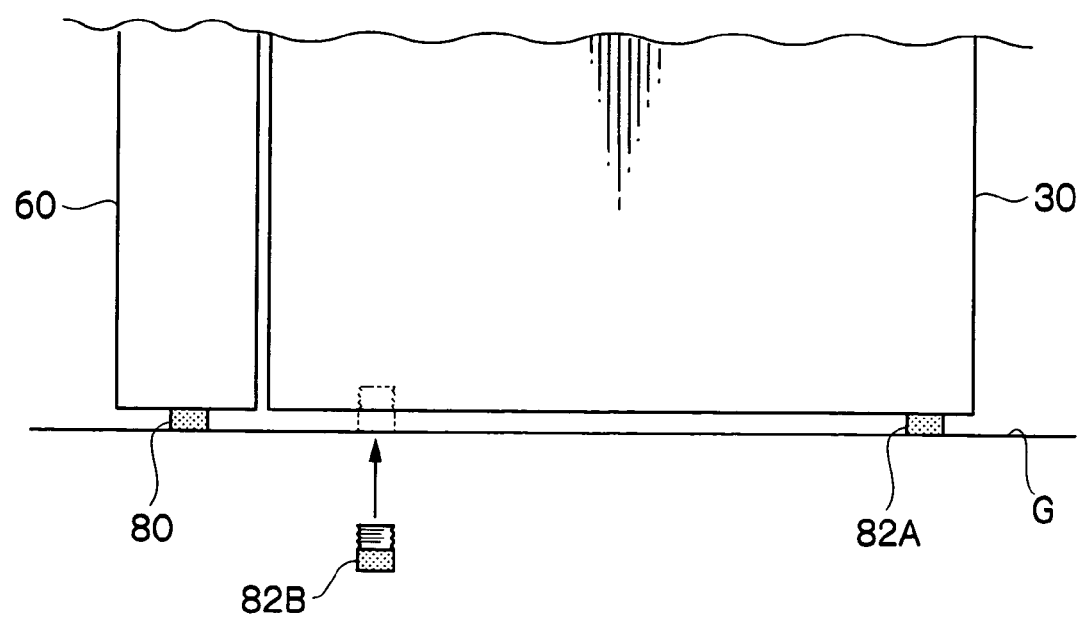
FIG. 12 is a schematic structural view showing another structure of the proximate support portion of the present embodiment.

In order to set the proximate support portions 82B out of contact with the floor surface G, it is also possible, as shown in FIG. 12, for the proximate support portions 82B to be structures which can be removed from the frame 30 (for example, being fixed by screwing in and removed from the frame 30 by unscrewing a thread, or the like).

Figure 13A:
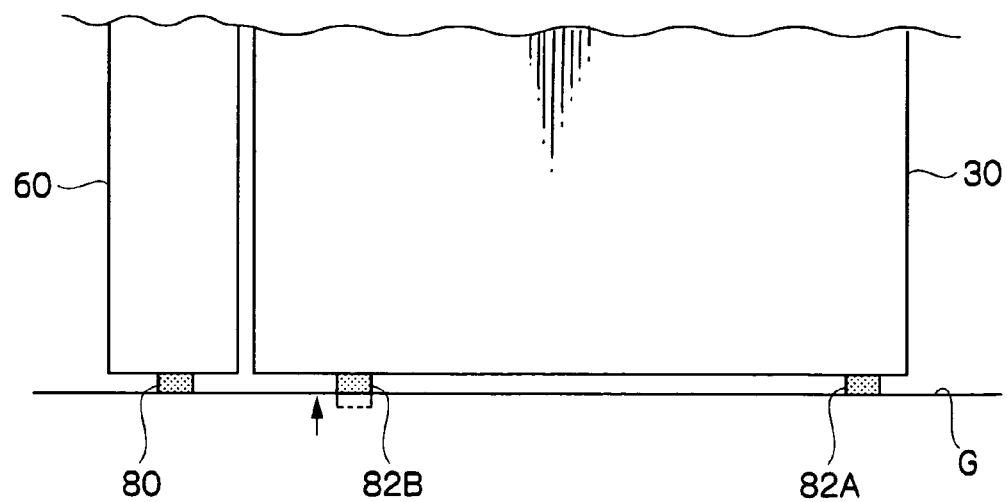
FIGS. 13A and 13B are schematic structural views showing still other structures of the proximate support portion of the present embodiment.

It is also possible to form a structure in which the proximate support portions 82B are softer than the first support portions 80 and the distant support portions 82A and can be deformed by pressure, as shown in FIG. 13A. For soft members, a rubber, a foam material or the like may be utilized. According to such a structure, if the proximate support portions 82B protrude from the plane constituted by the first support portions 80 and the distant support portions 82A, the proximate support portions 82B will be pressed against the floor surface G and compressed, and thus will retract toward the frame 30. Thus, the image formation device 10 can be stably supported at the floor surface G.

Figure 13B:
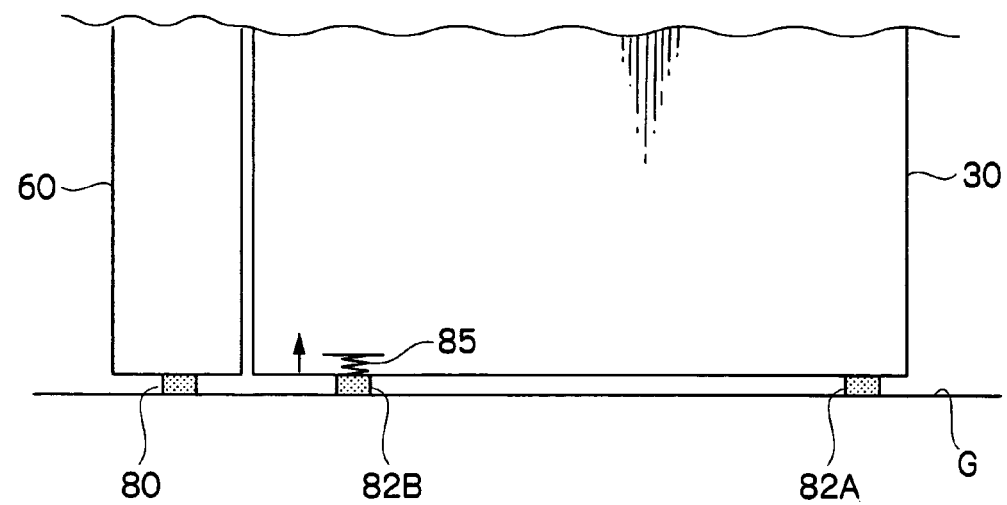

Further yet, as shown in FIG. 13B, the proximate support portions 82B may be mounted with a spring 85 interposed between each proximate support portion 82B and the frame 30. According to such a structure, if the proximate support portions 82B protrude from the plane constituted by the first support portions 80 and the distant support portions 82A, the proximate support portions 82B will be pressed against the floor surface G, the springs 85 will resiliently deform, and thus the proximate support portions 82B will retract toward the frame 30. Thus, the image formation device 10 can be stably supported at the floor surface G.

As shown in FIG. 1, the frame 30 and the support body 60 are covered with a casing 16. At lower portions of each of two side faces of this casing 16, first recess portions 18A, which serve as handles, are formed at locations corresponding with the support body 60. Further, second recess portions 18B serving as handles are formed at the near side of the lower portions of the two side faces of the casing 16, to correspond with the frame 30. Hence, because the handles are provided at both the support body 60 side and the frame 30 side, it is possible for weight of the image acquisition section 14 to be taken up at the first recess portions 18A and for weight of the image formation section 12 to be taken up at the second recess portions 18B. Thus, the image formation device 10 can be lifted up with good balance.

Horizontal support portions 19 are formed to the horizontal direction nearward side from an upper portion of the support body 60. The horizontal support portions 19 are cantilever supports for stably supporting the image acquisition section 14 on the support body 60.

As has been described above, according to the image formation device 10 of the present embodiment, the image acquisition section 14 is supported from the floor surface G by the support body 60 and the image formation section 12 is supported from the floor surface G by the frame 30. Therefore, in comparison with a case in which the image formation section 12 and the image acquisition section 14 are supported by the same member, vibrations of the image acquisition section 14 are less easily propagated to the image formation section 12, and adverse effects on image formation can be suppressed.

Furthermore, because the support body 60 is attached at side portions of a rear face side of the frame 30, weight of the frame 30 will not be applied to the support body 60. Moreover, because the frame 30 and the support body 60 are joined, in comparison with a case in which the casing 16 and the support body 60 are joined, the image formation device 10 can be made smaller.

Figure 14:
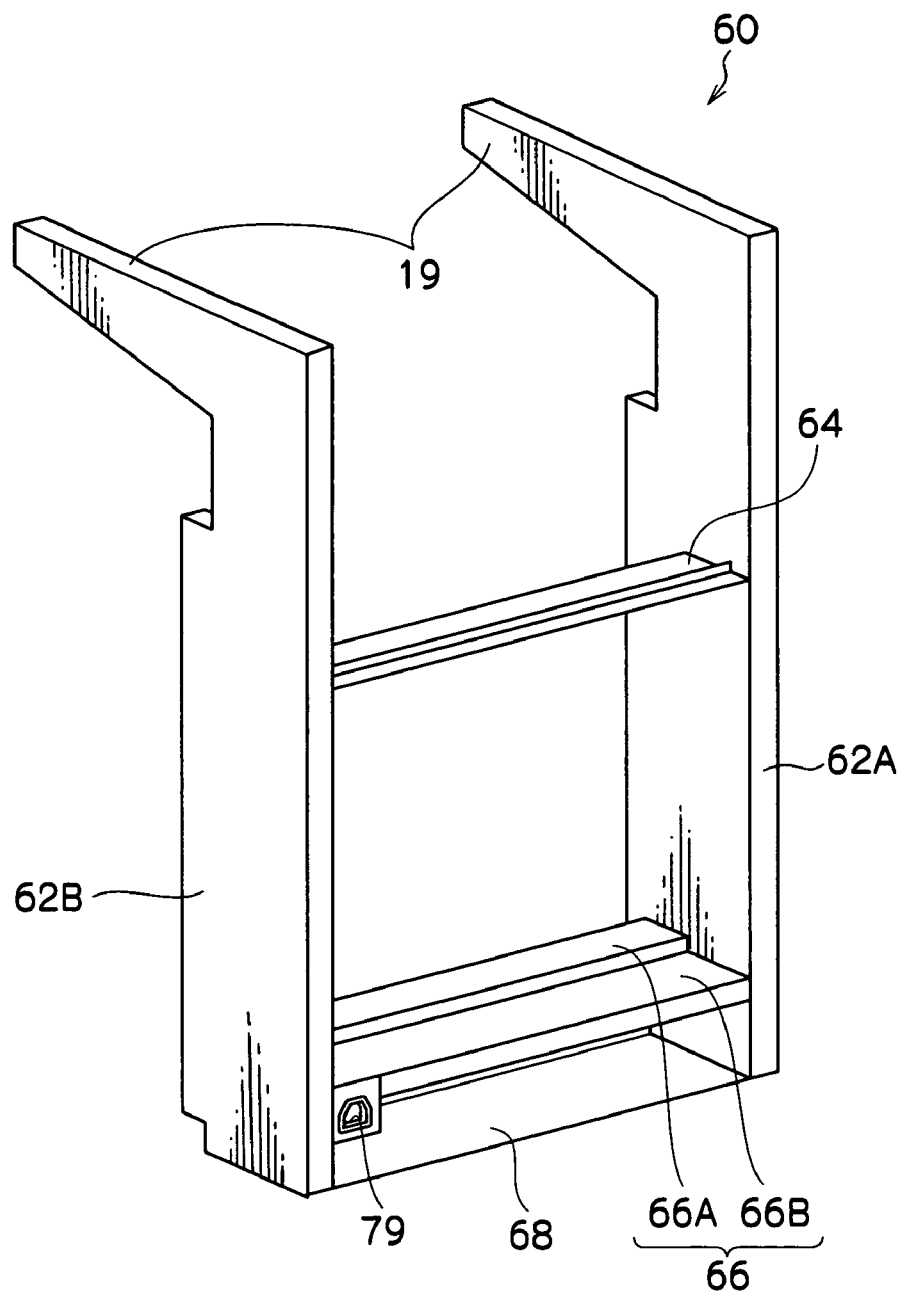
FIG. 14 is a schematic structural view showing another structure of the support body of the present embodiment.

In the present embodiment, the horizontal support portions 19 are structured as separate members from the support body 60. However, the horizontal support portions 19 may be structured integrally with the support pillars 62A and 62B, as shown in FIG. 14. Hence, because the horizontal support portions 19 and the support pillars 62A and 62B are structured integrally, strengths of those portions can be raised, and warping and the like can be suppressed.

As has been described above, an image formation device of a first aspect relating to the present invention includes: an image formation section which forms an image on a recording medium; a frame which accommodates the image formation section and is supported at a base surface; an image acquisition section which is disposed at an upper side relative to the image formation section; and a support body which supports the image acquisition section at the base surface and to which a side portion of the frame is attached.

In an image formation device of the structure described above, the image formation section is accommodated in the frame and the frame is supported at the base surface. The image acquisition section is also supported at the base surface, by the support body. This base surface may be a floor face, and may be a surface of a body such as a pedestal which is mounted on casters so as to be movable. Thus, the image formation section and the image acquisition section are supported separately at the base surface.

In an image formation device of a second aspect of the present invention, the frame is attached to the support body via a shock-absorbing structure which absorbs vibrations.

In an image formation device of a third aspect of the present invention, the shock-absorbing structure is structured to include a movable connection member which connects the support body and the frame to be movable relative to one another in a vertical direction.

In an image formation device of a fourth aspect of the present invention, the shock-absorbing structure is a structure at which an attachment portion of the frame to the support body is lower in stiffness than another portion of the frame.

In an image formation device of a fifth aspect of the present invention, the shock-absorbing structure is structured to include a resiliently deformable resilient member.

In an image formation device of a sixth aspect of the present invention, the shock-absorbing structure is structured with a deformable frame body disposed between the frame and the support body.

In an image formation device of a seventh aspect of the present invention, the support body is structured to include a pair of support pillars, which are disposed to be spaced apart from one another, and a support pillar connection member, which connects the two support pillars with one another.

In an image formation device of an eighth aspect of the present invention, the pair of support pillars is structured to include a horizontal portion in a horizontal direction on which the image acquisition section is placed, at an upper portion, and a vertical portion which is structured integrally with the horizontal portion and is provided standing in a vertical direction.

In an image formation device of a ninth aspect of the present invention, the pair of support pillars are provided standing with a gap formed therebetween at a rear face side of the frame, and a control unit which controls the image formation section and the image acquisition section is disposed between the pair of support pillars.

In an image formation device of a tenth aspect of the present invention, at the support pillar connection member, a step is structured at which a side closer to the frame is higher than a rear face side of the support pillar connection member, and a control circuit board structuring a portion of the control unit is attached to a step wall face structuring the step.

In an image formation device of an eleventh aspect of the present invention, the control circuit board is fixed to the step wall face by a threaded member, the support pillar connection member is set to a ground potential, and the control circuit board is connected to the support pillar connection member via the threaded member, for bringing the control circuit board to the ground potential.

In an image formation device of a twelfth aspect of the present invention, the control unit is joined with the frame and the support body.

An image formation device of a thirteenth aspect of the present invention includes: a first support portion which is disposed at a lower side of the support body and which supports the support body and the image acquisition section at the base surface; and a second support portion which is disposed at a lower side of the frame and which supports the image formation section at the base surface.

In an image formation device of a fourteenth aspect of the present invention, the second support portion includes a proximate support portion which is disposed at a side closer to the first support portion and a distant support portion which is disposed at a position further than the proximate support portion from the first support portion, and the proximate support portion is movable to a non-contact position at which the proximate support portion does not touch the base surface.

According to the structure described above, the image formation section is supported at the proximate support portion and the distant support portion, but the proximate support portion can be set out of contact with the base surface.

Here, the non-contact position may be any position that is not touching the base surface, including cases in which the proximate support portion is bodily removed or put out of contact by being folded up.

In an image formation device of a fifteenth aspect of the present invention, the proximate support portion is moved to the non-contact position in conjunction with attachment of the frame to the support body.

In an image formation device of a sixteenth aspect of the present invention, the second support portion includes a proximate support portion which is disposed at a side closer to the first support portion and a distant support portion which is disposed at a position further than the proximate support portion from the first support portion, and the proximate support portion is a structure which is retractable toward the frame.

In an image formation device of a seventeenth aspect of the present invention, the proximate support portion is structured with a soft member which is softer than the first support portion and the distant support portion, and the soft member is deformed by pressure for retracting toward the frame.

Here, urethane foam, silicon rubber, etc. can be utilized for the soft member.

In an image formation device of an eighteenth aspect of the present invention, the proximate support portion is structured to include a resilient member, and is resiliently deformed toward the frame by pressure.

Here, rubber, a spring, etc. can be utilized for the resilient member.

An image formation device of a nineteenth aspect of the present invention includes a reinforcement member which reinforces attachment of the support body to the frame.

In an image formation device of a twentieth aspect of the present invention, the frame is attached to the support body at a plurality of attachment positions, and the reinforcement member is provided at, of the attachment positions, at least a subset that is located furthest downward.

In an image formation device of a twenty-first aspect of the present invention, the frame is structured to include resin.

An image formation device of a twenty-second aspect of the present invention includes a casing body which covers the support body and an outer side of the frame, and which is structured with recess-form handles at the frame and at the support body.

A support body of a twenty-third aspect of the present invention supports an image acquisition section at a base surface, the image acquisition section being disposed at an upper side relative to an image formation section, and a side portion of a frame which accommodates the image formation section is attachable to the support body.

A support body of a twenty-fourth aspect of the present invention includes a pair of support pillars and a support pillar connection member, which connects the two support pillars with one another.

In a support body of a twenty-fifth aspect of the present invention, the pair of support pillars is structured to include a horizontal portion in a horizontal direction on which the image acquisition section is placed, at an upper portion, and a vertical portion which is structured integrally with the horizontal portion and is provided standing in a vertical direction.

In a support body of a twenty-sixth aspect of the present invention, the pair of support pillars are provided standing with a gap formed therebetween at a rear face side of the frame, and the rear face side of the frame is attached at the pair of support pillars.

What is claimed is:

1. An image formation device, to be supported on a base surface, comprising:
   an image formation section which forms an image on a recording medium;
   a frame which accommodates the image formation section and is supported on the base surface;
   an image acquisition section which is disposed at an upper side relative to the image formation section; and
   a support body which is supported on the base surface, the support body supporting the image acquisition section and to which a side portion of the frame is attached,
   wherein the frame is attached to the support body via a shock-absorbing structure which absorbs vibrations.

2. The image formation device of claim 1, wherein the shock-absorbing structure comprises a movable connection member which connects the support body and the frame to be movable relative to one another in a vertical direction.

3. The image formation device of claim 1, wherein the shock-absorbing structure comprises structure at which an attachment portion of the frame to the support body is lower in stiffness than another portion of the frame.

4. The image formation device of claim 1, wherein the shock-absorbing structure comprises a resiliently deformable resilient member.

5. The image formation device of claim 1, wherein the shock-absorbing structure comprises a deformable frame body disposed between the frame and the support body.

6. The image formation device of claim 1, wherein the support body comprises a pair of support pillars, which are disposed to be spaced apart from one another, and a support pillar connection member, which connects the two support pillars with one another.

7. The image formation device of claim 6, wherein the pair of support pillars comprises
   a horizontal portion in a horizontal direction on which the image acquisition section is placed, at an upper portion, and
   a vertical portion which is structured integrally with the horizontal portion and is provided standing in a vertical direction.

8. The image formation device of claim 6, wherein
   the pair of support pillars are provided standing with a gap formed therebetween at a rear face side of the frame, and a control unit which controls the image formation section and the image acquisition section is disposed between the pair of support pillars.

9. The image formation device of claim 8, wherein the support pillar connection member comprises a step at which a side closer to the frame is higher than a rear face side of the support pillar connection member, and a control circuit board structuring a portion of the control unit is attached to a step wall face structuring the step.

10. The image formation device of claim 9, wherein the control circuit board is fixed to the step wall face by a threaded member, the support pillar connection member is set to a ground potential, and the control circuit board is connected to the support pillar connection member via the threaded member, for bringing the control circuit board to the ground potential.

11. The image formation device of claim 8, wherein the control unit is joined with the frame and the support body.

12. The image formation device of claim 1, further comprising:
a first support portion which is disposed at a lower side of the support body and which supports the support body and the image acquisition section at the base surface; and
a second support portion which is disposed at a lower side of the frame and which supports the image formation section at the base surface.

13. The image formation device of claim 12, wherein the second support portion comprises
a proximate support portion which is disposed at a side closer to the first support portion and
a distant support portion which is disposed at a position further than the proximate support portion from the first support portion,
and the proximate support portion is movable to a non-contact position at which the proximate support portion does not touch the base surface.

14. The image formation device of claim 13, wherein the proximate support portion is moved to the non-contact position in conjunction with attachment of the frame to the support body.

15. The image formation device of claim 12, wherein the second support portion comprises
a proximate support portion which is disposed at a side closer to the first support portion and
a distant support portion which is disposed at a position further than the proximate support portion from the first support portion,
and the proximate support portion includes a structure which is retractable toward the frame.

16. The image formation device of claim 15, wherein the proximate support portion is structured with a soft member which is softer than the first support portion and the distant support portion, and the soft member is deformed by pressure for retracting toward the frame.

17. The image formation device of claim 15, wherein the proximate support portion comprises a resilient member, and is resiliently deformed toward the frame by pressure.

18. The image formation device of claim 1, further comprising a reinforcement member which reinforces attachment of the support body to the frame.

19. The image formation device of claim 18, wherein the frame is attached to the support body at a plurality of attachment positions, and the reinforcement member is provided at, of the attachment positions, at least a subset that is located furthest downward.

20. The image formation device of claim 1, wherein the frame comprises resin.

21. The image formation device of claim 1, further comprising a casing body which covers the support body and an outer side of the frame, and which is structured with recess-form handles at the frame side and at the support body side.

22. A support body, wherein:
the support body supports an image acquisition section at a base surface, the image acquisition section being disposed at an upper side relative to an image formation section,
a side portion of a frame which accommodates the image formation section is attachable to the support body, and
the support body comprises a pair of support pillars and a support pillar connection member, which connects the two support pillars with one another.

23. The support body of claim 22, wherein the pair of support pillars comprises
a horizontal portion in a horizontal direction on which the image acquisition section is placed, at an upper portion, and
a vertical portion which is structured integrally with the horizontal portion and is provided standing in a vertical direction.

24. The support body of claim 22, wherein:
the pair of support pillars are provided standing with a gap formed therebetween at a rear face side of the frame, and
the rear face side of the frame is attached at the pair of support pillars.

25. An image formation device comprising:
an image formation section that forms an image on a recording medium;
an image acquisition section that reads an image;
a frame that accommodates the image formation section;
a support body that supports the image acquisition section, the support body being placed adjacent to the frame; and
a connection that connects the frame and the support body flexibly.

26. The image forming device of claim 25 wherein the frame is attached to the support body via a shock-absorbing structure which absorbs vibrations.

27. An image formation device, to be supported on a base surface, comprising:
an image formation section which forms an image on a recording medium;
a frame which accommodates the image formation section and is supported on the base surface;
an image acquisition section which is disposed at an upper side relative to the image formation section; and
a support body which is supported on the base surface, the support body supporting the image acquisition section and to which a side portion of the frame is attached,
wherein the frame does not support the entire weight of the image acquisition section.

* * * * *